United States Patent [19]

McKay

[11] Patent Number: 5,166,683
[45] Date of Patent: Nov. 24, 1992

[54] FUNCTION KEY GUIDE AND TEMPLATE

[76] Inventor: David C. McKay, 10417 165th Pl. NE., Redmond, Wash. 98052

[21] Appl. No.: 658,755

[22] Filed: Feb. 20, 1991

[51] Int. Cl.$^5$ .......................... G06F 1/00; G06C 7/02
[52] U.S. Cl. ....................................... 341/22; 341/23; 364/709.1
[58] Field of Search .................... 341/22, 23; 340/712; 400/717, 719; 235/145 R, 145 A, 146; 364/708, 709.1; 434/118, 227; 411/904; 403/2, DIG. 3, DIG. 10

[56] References Cited

U.S. PATENT DOCUMENTS

| | | | |
|---|---|---|---|
| D. 158,481 | 5/1950 | Lugar | 434/227 |
| 4,119,839 | 10/1978 | Beckmann | 341/23 |
| 4,935,888 | 6/1990 | Heston | 235/145 R |

Primary Examiner—Donald J. Yusko
Assistant Examiner—Michael Krakovsky
Attorney, Agent, or Firm—Trask, Britt & Rossa

[57] ABSTRACT

A function key guide and template (10) having a template (30) and function key guide (28) removably attached together by breakaway connectors (32) for use on a keyboard (12). The connectors (32) have preformed breaking points (66) in their first ends (62) and second ends (64) to facilitate manual separation of the connectors (32) from the template (30) and the guide (28). With the connectors (32) remaining attached to either of the template (30) or the guide (28), the connectors (32) facilitate in holding the template (30) and/or the guide (28) in alignment with the function keys (22) on the keyboard (12). The connectors (32) may also be completely removed to permit use of the guide (28) and/or the template (30) with nonconforming keyboard configurations. Ideally the guide (28) is formed of left and right halves (38 and 40) and the template (30) is formed of left and right halves (34 and 36) to enable folding of the function key guide and template (10) for storage and transportation.

20 Claims, 2 Drawing Sheets

FUNCTION KEY GUIDE AND TEMPLATE

TECHNICAL FIELD

The present invention pertains to templates, and more particularly, to a combination template and function key guide for computer keyboards wherein the function key guide can be manually separated from the template by means of selectively removable breakaway connectors. These connectors can be used to facilitate alignment of the function key guide and/or the template with the function keys on the computer keyboard.

BACKGROUND OF THE INVENTION

Typically, computer keyboards include a face with a plurality of articulated keys projecting out of openings formed in the face. The keys are arranged in rows across the keyboard in a fashion similar to the well-known typewriter keys. In addition, computer keyboards also include cursor control keys, a ten-key number pad, and a plurality of function keys. These function keys are used to perform specific operations within the disk operating system or within the program currently being used. Typically, these function keys are identified with the indicia F1, F2, etc., and the effect of these keys will vary depending on the program being run by the computer.

Because the function keys are generically labeled, as described above, the effect of using a particular function key with a particular program is not readily apparent to an operator. As a consequence, a number of aids have been developed to identify to the operator the purpose and/or effect of a particular function key. One method for identifying function keys uses a self-adhesive material that is applied to the face of the keyboard in close proximity to the function keys and having printing thereon that cryptically identifies the use and purpose of the function keys. The disadvantage to this particular method is that the self-adhesive material cannot be easily removed from the keyboard. Thus, when the function of the keys changes because of a change in computer programs, the self-adhesive label must be covered up or peeled off of the keyboard and discarded.

Other methods for identifying the keys include using a plastic template that is placed over the keys and rests on the keyboard. While these templates may be suitable to their purpose, they have a number of drawbacks. First, these templates may be constructed of rather flimsy material that can be easily broken with use. However, templates constructed of more rigid material can be bulkier, limited in application to a particular keyboard configuration and are not adaptable to other arrangements of keys. For instance, function keys are usually placed in the top row of keys on the computer keyboard, and are positioned together in groups of three or four with a space, typically the width of one key, positioned between the groups. A template designed to fit around function keys grouped in threes will not work with a template designed to rest in the spaces between function keys arranged in groups of four. Furthermore, the top portion of the template resting on the face of the keyboard above the function keys cannot be removed from the lower portion of the template resting below the function keys, thus limiting the application of the template to particular keyboard configurations. Consequently, there is a need for a computer keyboard function key template having manually separable connectors to enable application of the template components to particular keyboard configurations.

SUMMARY OF THE INVENTION

The present invention is directed to a function key guide and template for use on computer keyboards having a face with a plurality of articulated keys projecting through openings in the face of the keyboard. The articulated keys are arranged in rows with the function keys preferably positioned in the top row of keys. The function key guide and template comprises a first planar plate member sized and shaped to be placed over and fit around the keys on the keyboard and rest on the face of the keyboard without interfering with the movement of the keys; a second plate member having a planar configuration that is sized and shaped to be placed over and fit around the keys on the keyboard and rest on the face of the keyboard without interfering with the movement of the keys. The function key guide and template further comprises at least one connecting member that connects the first plate member to the second plate member, with the connecting member being positioned between the first and second plate members such that when the template is resting on the keyboard face, the connecting member will be positioned between the keys and not interfere with the movement of the keys. The connecting member further includes at least one pre-formed breakpoint that enables manual separation of the connecting member from either or both of the first and second plates.

In accordance with another aspect of the present invention, the first and second plates are integrally formed with two connecting members that are positioned with respect to the first and second plates so that when the plates are placed on the keyboard, the connecting members will not interfere with the movement of the function keys.

In accordance with yet another aspect of the present invention, the pre-formed breakpoint is formed in the bottom surface of each connecting member. More preferably, two breakpoints are formed on each connecting member, one breakpoint at one end of the connecting member and a second breakpoint at the other end of the connecting member. When so formed, the first and second breakpoints will be adjacent the first and second plates, respectively, to facilitate manual separation of the connecting member at either or both of the first and second plates.

In accordance with a further aspect of the present invention, the pre-formed breakpoint comprises a groove formed in the bottom surface of the connecting member, preferably laterally across the connecting member. This groove forms a preformed stress point that allows the connecting member to break adjacent the first and/or second plates when subjected to a predetermined load.

In accordance with yet another aspect of the present invention, each groove has a V-shaped cross-sectional configuration that enables manual breaking of the connecting member by allowing the first or second plate to rotate in either direction about an axis coinciding with the apex of the V-shaped groove.

In accordance with a further aspect of the present invention, the first and second plates are formed of a left and right half that are hingedly attached to permit folding of the guide and template.

As will be readily appreciated from the foregoing description, the present invention provides an articulated function key guide and template that are integrally connected together with connecting members that have preformed stress points adjacent the template and the function key guide. This permits an operator to separate the function key guide from the template and use only one of the components as needed or desired. In addition, the connecting members can be broken off adjacent the component to be discarded so that the connecting member remains on the useable component, such as the guide, to facilitate alignment of the guide with the function keys. Should the configuration of the function keys be incompatible with the positioning of the connecting members, the connecting members can be easily removed from both the function key guide and the template. The preformed breakpoint on the connecting members is positioned on the bottom surface of the connecting members to present a more appealing appearance. In addition, the use of a V-shaped groove formed laterally across the connecting member precisely fixes the breaking point when a predetermined load is applied to the connecting member, thus eliminating jagged projections that are not only unappealing in appearance but also dangerous. Finally, both the guide and the template are formed in two halves, a left half and a right half, and are hingedly attached to permit folding of the template and the guide for storage and transportation.

BRIEF DESCRIPTION OF THE DRAWINGS

The foregoing and other features and advantages of the present invention will be more readily appreciated as the same becomes better understood from the detailed description when taken in conjunction with the following drawings, wherein.

DETAILED DESCRIPTION OF A PREFERRED EMBODIMENT

Figure 1:
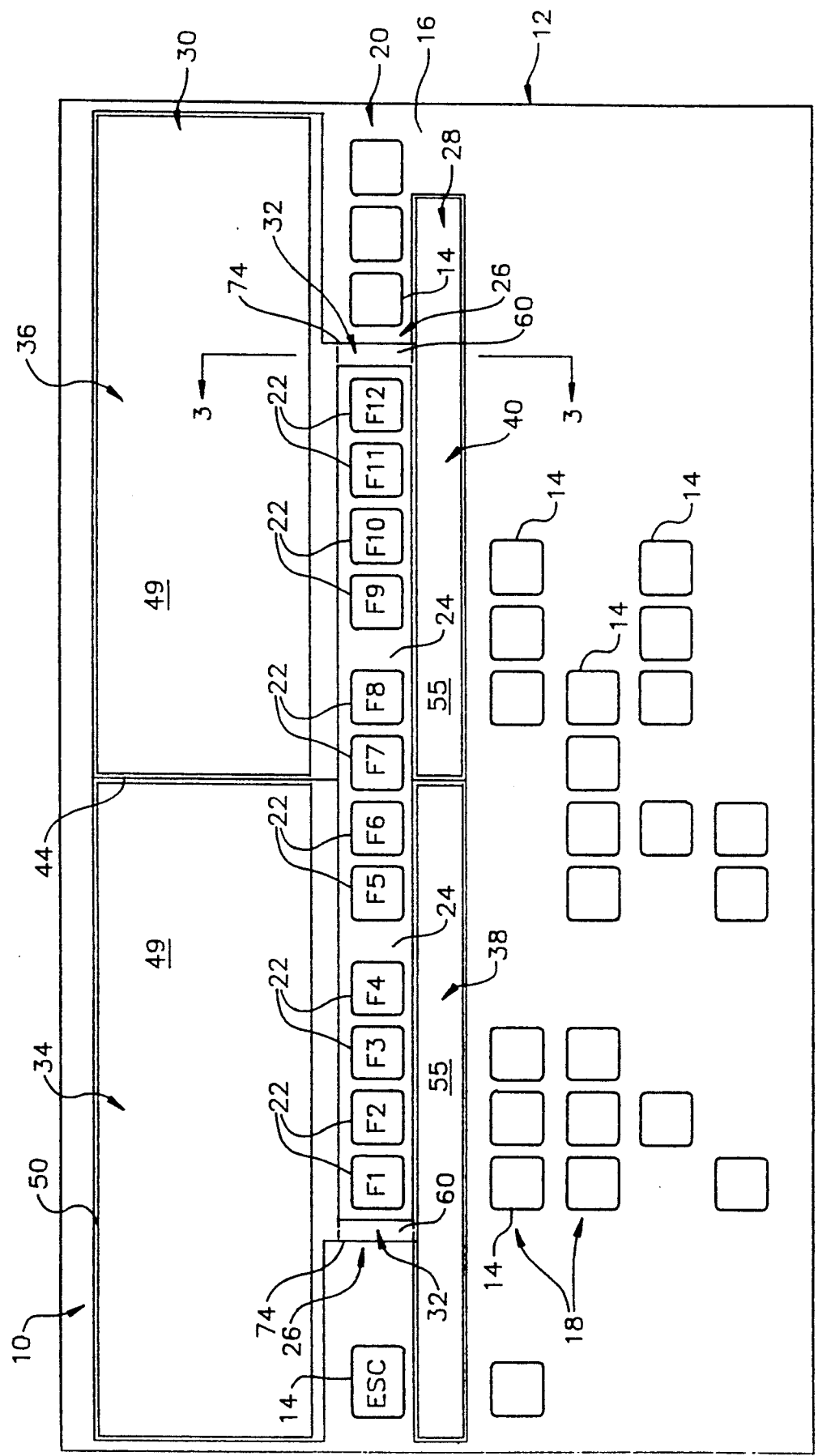
FIG. 1 is a top plan view of the function key guide and template formed in accordance with the present invention.

Referring initially to FIG. 1, a representative embodiment of the function key guide and template 10 formed in accordance with the present invention is illustrated. The template 10 is shown resting on a keyboard 12, which is shown in phantom for purposes of illustration. The keyboard 12 is representative of typical keyboard configurations in use at the present time, wherein a plurality of articulated keys 14 project through openings in the face 16 of the keyboard. The keys 14 are arranged in rows 18 with the top row 20 having twelve function keys 22. The function keys 22 are arranged in groups of four having intervening spaces 24 between the groups and a large gap 26 at each end of the row of function keys 22 separating the function keys 22 from other keys 14 in the top row 20 of keys 14.

The function key guide and template 10 includes a function key guide 28 resting on the face 16 of the keyboard 12 adjacent and below the top row 20 of function keys 22, a template 30 resting on the face 16 of the keyboard 12 adjacent and above the top row 20 of function keys 22, and a pair of breakaway connectors 32 connecting the guide 28 to the template 30. The connectors 32 are positioned to rest in the gap 26 at each end of the row of function keys 22. The template 30 is formed of a left half 34 and right half 36, and the guide 28 is also formed of a left half 38 and right half 40. The left and right halves 34 and 36 of the template 30 are hingedly joined together as are the left halves 38 and right halves 40 of the guide 28. Ideally, fibrous tape 42 (shown in FIG. 2) is used to hingedly attach the halves together to permit the function key guide and template 10 to fold about the hinge point 44.

Figure 2:
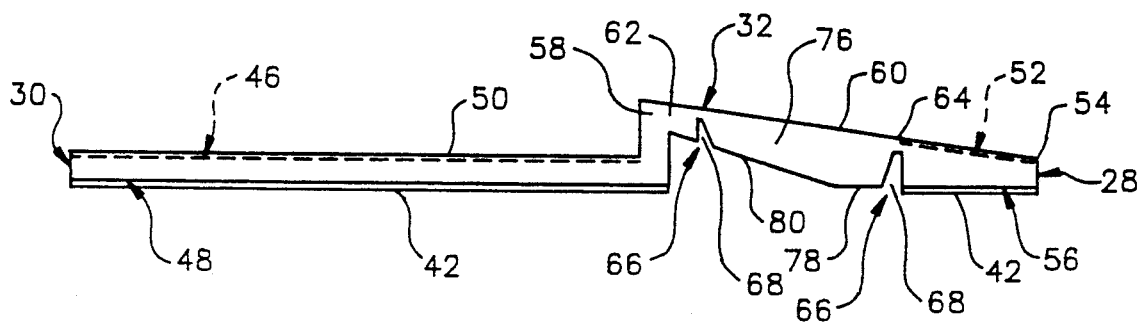
FIG. 2 is an end view of the function key guide and template of FIG. 1.

The template 30 has a planar configuration that is rectangularly shaped with a smooth top surface 46 and a bottom surface 48, which is illustrated more clearly in FIG. 2. Ideally, a rim 50 circumscribes the top surface 46 of the left and right halves 34 and 36 of the template 30 to define an enclosed area 49 in which a self-adhesive label or small book (not shown) can be affixed. Typically, these labels and books contain helpful instructions and hints to remind the operator how to perform certain functions and other tasks for a particular program being used in the computer. Similarly, the guide 28 has a smooth top surface, which is enclosed by a circumscribing rim 54 to define an enclosed area 55, and an opposing bottom surface 56.

The template 30 includes an upright wall 58 along the entire width of the lower edge. This wall 58 is used to elevate the connecting members 32 above a corresponding ridge formed in the face 16 of the keyboard 12 between the top portion of the keyboard 12 and the top row 20 of function keys 22.

The breakaway connectors 32 will now be described in greater detail in conjunction with FIGS. 2 and 3. Each connector 32 includes an elongate planar body 60 having a first end 62 and a second end 64. The first end 62 is attached to the template 30 and the second end 64 is attached to the guide 28. Ideally, the first and second ends 62 and 64 are integrally formed with the template 30 and guide 28. Formed laterally across the first and second ends 62 and 64 of the body 60 are preformed breaking points 66. Ideally, these breaking points 66 are grooves 68 having a generally V-shaped cross-sectional configuration. These breaking points 66 are designed to break when subjected to a predetermined load. Ideally, the predetermined load is in the range of pressure that can be manually applied with human hands.

The grooves 68 are formed in the bottom surface 70 of the connectors 32, leaving the top surface 72 smooth and visually appealing.

Figure 3:
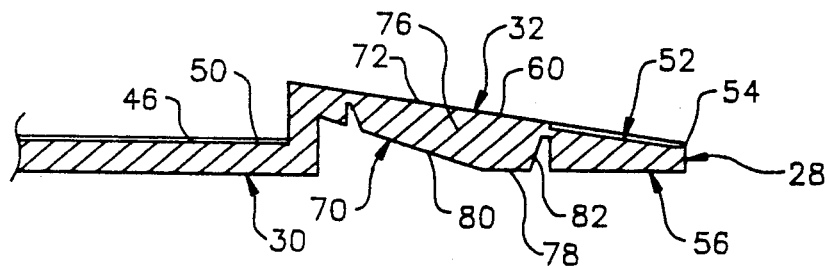
FIG. 3 is a side cross-sectional view taken along lines 3—3 of the function key guide and template of FIG. 1.

Each connector 32 has an outside edge 74, as seen more clearly in FIG. 1, with a wall 76 depending downward therefrom, as shown more clearly in FIGS. 2 and 3. Preferably, the wall has a bottom edge 78 that lies in the same plane as the bottom surface 56 of the guide 28 to assist in supporting the guide 28 and connector 32 on the face 16 of the keyboard 12. The bottom edge 78 intersects with a forward edge 80 that angles upward to intersect one side of the V-shaped grooves 68 at the first end 62 of the connector body 60. The bottom edge 78 of the wall 76 also intersects with a rearward edge 82 that angles upward into the groove 68 at the second end 64 of the connector body 60 at the same angle as the wall of the V-shaped groove 68.

Preferably, the function key guide and template 10 are formed of molded conventional plastic. With this material and the grooves 68 formed in the connectors 32, the connectors 32 can be separated from the template 30 at the first end 62 of the guide 28, at the second end 64, or both. In other words, the guide 28 can be removed from the connector 32 at the second end 64 by manually bending the guide 28 at the groove 68 until the plastic separates. The template 30 can then be placed on the face 16 of the keyboard 12 with the connectors 32 projecting into the gaps 26 on either side of the function keys 22 and resting on the face 16 of the keyboard 12 to assist in aligning the template 30 on the keyboard 12. Similarly, only the template 30 need be removed from the connectors 32 at the first end 62, and the guide 28 can be placed on the face 16 of the keyboard 12 immediately below the function keys 22 so that the connectors 32 project upward into the gaps 26 to assist in holding the guide 28 in alignment with the function keys 22. Finally, the connectors 32 can be completely removed by separating them at both ends 62 and 64 to enable separate use of the guide 28 and the template 30 individually.

While a preferred embodiment of the invention has been illustrated and described, it is to be understood that various changes can be made therein without departing from the spirit and scope of the invention. For instance, the connectors 32 may be positioned to rest in the spaces 24 instead of in the gaps 26 on the keyboard face 16. Consequently, the scope of the invention is to be limited only by the claims that follow.

The embodiments of the invention in which an exclusive property or privilege is claimed are defined as follows:

1. A template and function key guide for a computer keyboard, the keyboard having a face and a plurality of articulated keys projecting through openings in the keyboard face, the template comprising:
   a first planar member sized and shaped to be placed over and fit around the keys on the keyboard and rest on the face of the keyboard without interfering with the movement of the keys;
   a second planar member sized and shaped to be placed over and fit around the keys on the keyboard and rest on the face of the keyboard without interfering with the movement of the keys; and
   at least one means for connecting said first planar member to said second planar member, said connecting means being positioned between said first and said second planar members such that when the template is resting on the keyboard face, said at least one connecting means will be positioned between the keys and not interfere with the movement of the keys, said at least one connecting means further including at least one preformed breakpoint to enable manual separation of said connecting means from said first planar member and said second planar member.

2. The template of claim 1, wherein said preformed breakpoint is formed adjacent either of said first said planar member and said second planar member wherein said connecting means remain attached to the other of said first planar member and said second planar member.

3. The template of claim 2, wherein said connecting means includes a top surface and a bottom surface, and further wherein said preformed breakpoint is formed in said bottom surface of said connecting means.

4. The template of claim 3, where said preformed breakpoint comprises a lateral groove in said bottom surface of said connecting means.

5. The template of claim 4, wherein said lateral groove has a V-shaped cross-sectional configuration.

6. The template of claim 1, wherein said first and said second planar members are each formed of a left and right half that are hingedly attached to permit folding of the template.

7. The template of claim 6, wherein said preformed breakpoint is formed adjacent either of said first planar member and said second planar member such that said connecting means remains attached on the other of said first planar member and said second planar member when said connecting means is broken.

8. The template of claim 7, wherein said connecting means has a top surface and a bottom surface, and further wherein said preformed breakpoint is formed in said bottom surface of said connecting means.

9. The template of claim 8, wherein said preformed breakpoint comprises a lateral groove formed in said bottom surface of said connecting means.

10. The template of claim 9, wherein said lateral groove has a V-shaped cross-sectional configuration.

11. A template and function key guide for a computer keyboard, the keyboard having a face and a plurality of articulated keys, including a plurality of function keys that are mounted to project through openings in the keyboard face, the template comprising:
   a first plate having a planar configuration that is sized and shaped to rest on the face of the keyboard adjacent to the function keys without interfering with the movement of the keys;
   a second plate having a planar configuration that is sized and shaped to rest on the keyboard face adjacent the function keys and in spaced relationship with said first plate without interfering with the movement of the keys on the keyboard; and
   two or more connecting members that connect said first plate to said second plate, each of said connecting members being positioned between said first and said second plates such that when said first and said second plates are resting on the keyboard face, each of said two or more connecting members will be positioned between the keys and will not interfere with the movement of the keys, each of said connecting members further including at least one preformed breakpoint to enable manual separation of said two or more connecting members from either of said first and said second plates.

12. The template of claim 11, wherein each of said two or more connecting members has a breakpoint formed adjacent said first plate and a breakpoint formed adjacent said second plate to permit selective removal of said connecting members from said first plate and said second plate such that said connecting member can be removed to prevent interference with the keys on the keyboard and said connecting members can remain attached to either of said first and said second plates to facilitate alignment of said first and said second plates on the keyboard.

13. The template of claim 12, wherein each of said two or more connecting members has a top surface and a bottom surface, and further wherein said preformed breakpoints are formed in said bottom surface.

14. The template of claim 13, wherein each of said breakpoints comprises a lateral groove formed in said bottom surface of said connecting members.

15. The template of claim 14, wherein each of said grooves has a V-shaped cross-sectional configuration.

16. A template and function key guide for a computer keyboard, the keyboard having a face and a plurality of articulated keys arranged in rows and projecting through openings in the keyboard face, the articulated keys including a plurality of function keys positioned in the top row of articulated keys on the keyboard face, the template comprising:

a first plate having a planar configuration that is sized and shaped to rest on the face of the keyboard above the row of function keys without interfering with the movement of the function keys, said first plate having a smooth top surface to receive a self-adhesive indicia;

a second plate having a planar configuration that is sized and shaped to rest on the face of the keyboard adjacent to and below the row of function keys without interfering with the movement of any of the keys on the keyboard, said second plate having a smooth top surface to receive self-adhesive indicia; and two connecting members, each connecting member having a first end integrally formed with said first plate and a second end integrally formed with said second plate to connect said first plate and said second plate, said connecting members being sized, shaped, and positioned between said first and said second plates such that when the template is resting on the keyboard face, said connecting members will be positioned between the function keys and avoid interfering with the movement of the function keys while facilitating alignment of said first and said second plates with said function keys such that indicia on said first and said second plates will be in alignment with said function keys, each of said connecting members further including a preformed breakpoint at said first end to enable manual separation of said connecting members from said first plate and a preformed breakpoint at said second end to enable manual separation of said connecting members from said second plate such that said connecting members can be selectively separated from either of said first plate and said second plate to enable either of said first plate and said second plate to rest on the keyboard without the presence and assistance of said connecting members and to permit either of said first plate and said second plate to rest on the face of the keyboard with the connecting members thereon to facilitate alignment of the other of said first plate and said second plate with the function keys.

17. The template of claim 16, wherein each of said connecting members has a top surface and a bottom surface, and further wherein said preformed breakpoint is formed in said bottom surface.

18. The template of claim 17, wherein said preformed breakpoint comprises a lateral groove formed in said bottom surface of each of said connecting members.

19. The template of claim 18, wherein each of said grooves has a V-shaped cross-sectional configuration.

20. The template of claim 19, wherein said first and said second plates are each formed of a left and right half that are hingedly attached to permit folding of the template.

* * * * *